Sept. 27, 1938.   H. GRANGER   2,131,559
FREQUENCY MEASURING SYSTEM
Original Filed July 27, 1934    2 Sheets-Sheet 1

INVENTOR.
HAROLD GRANGER
BY John B Grady
ATTORNEY

Sept. 27, 1938.                H. GRANGER                    2,131,559
                        FREQUENCY MEASURING SYSTEM
                Original Filed July 27, 1934    2 Sheets-Sheet 2

INVENTOR.
HAROLD GRANGER
BY John B. Grady
ATTORNEY

Patented Sept. 27, 1938

2,131,559

UNITED STATES PATENT OFFICE 2,131,559

FREQUENCY MEASURING SYSTEM

Harold Granger, Cherrydale, Va., assignor, by mesne assignments, to Bendix Radio Corporation, New York, N. Y., a corporation of Delaware Original application July 27, 1934, Serial No. 737,309. Divided and this application March 6, 1935, Serial No. 9,675

9 Claims. (Cl. 250—39)

My invention relates broadly to high frequency systems and more particularly to selective oscillator systems adapted to the measurement of the frequency of a given oscillation.

This application is a division of my copending application Serial Number 737,309, filed July 27, 1934, for "Selective high frequency oscillator system".

One of the objects of my invention is to provide a decade arrangement of frequency determining elements in association with a plurality of oscillation circuits adapted to measure the frequency of a given oscillation.

Another object of my invention is to provide a balanced mixer circuit for combining two frequencies wherein the currents flowing at one of the frequencies are opposed and cancelled in the output of the mixer circuit.

Still another object of my invention is to provide a system for checking and determining the frequency of an electrical oscillation with a high degree of precision.

A further object of my invention is to provide an automatic arrangement whereby the frequency of an electrical oscillation may be measured and a permanent record made of such frequency.

A still further object of my invention is to measure the frequency of a given oscillation by synthesizing a balancing frequency in successive decade stages in accordance with the unknown decade values of the frequency in a given oscillation.

Figure 1:
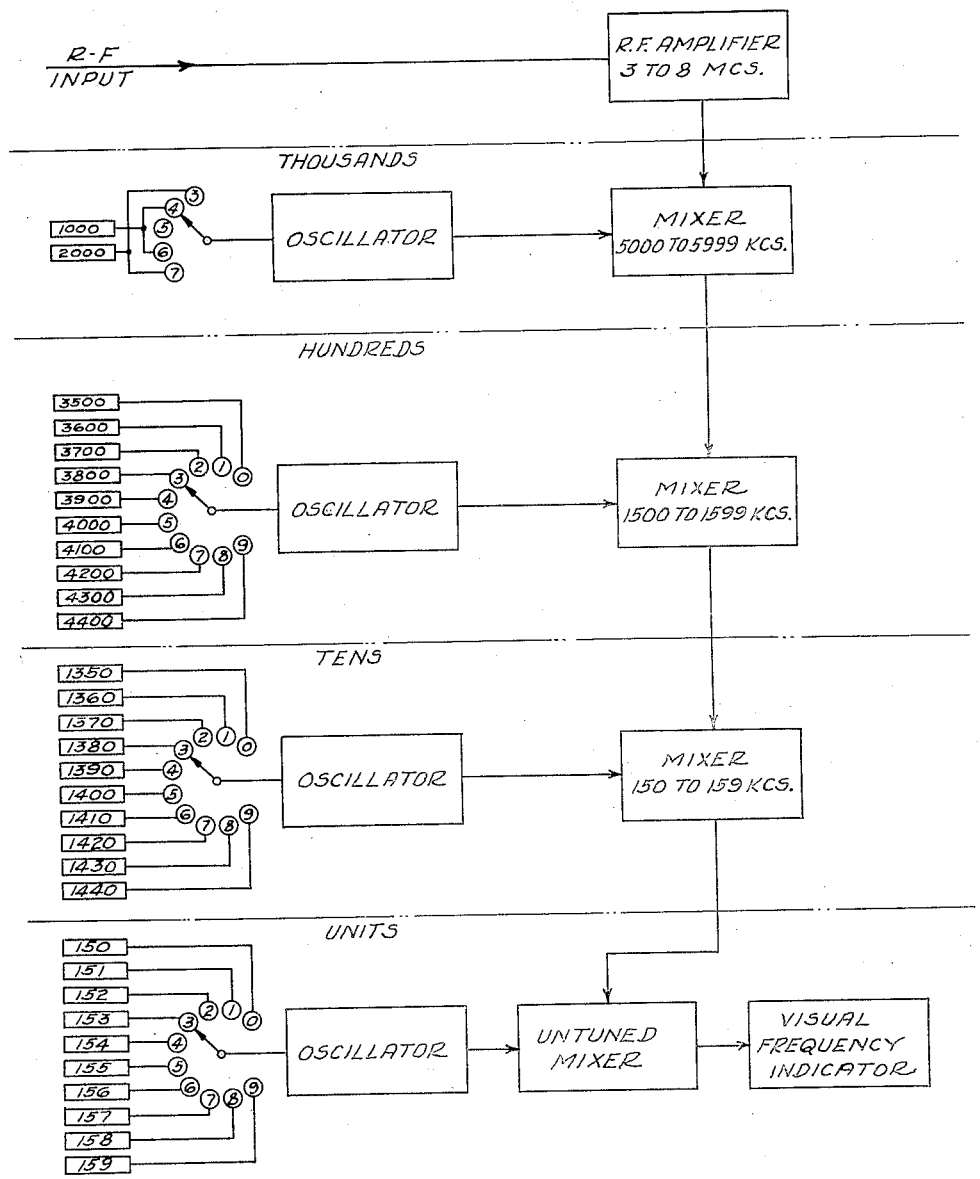
Figure 2:
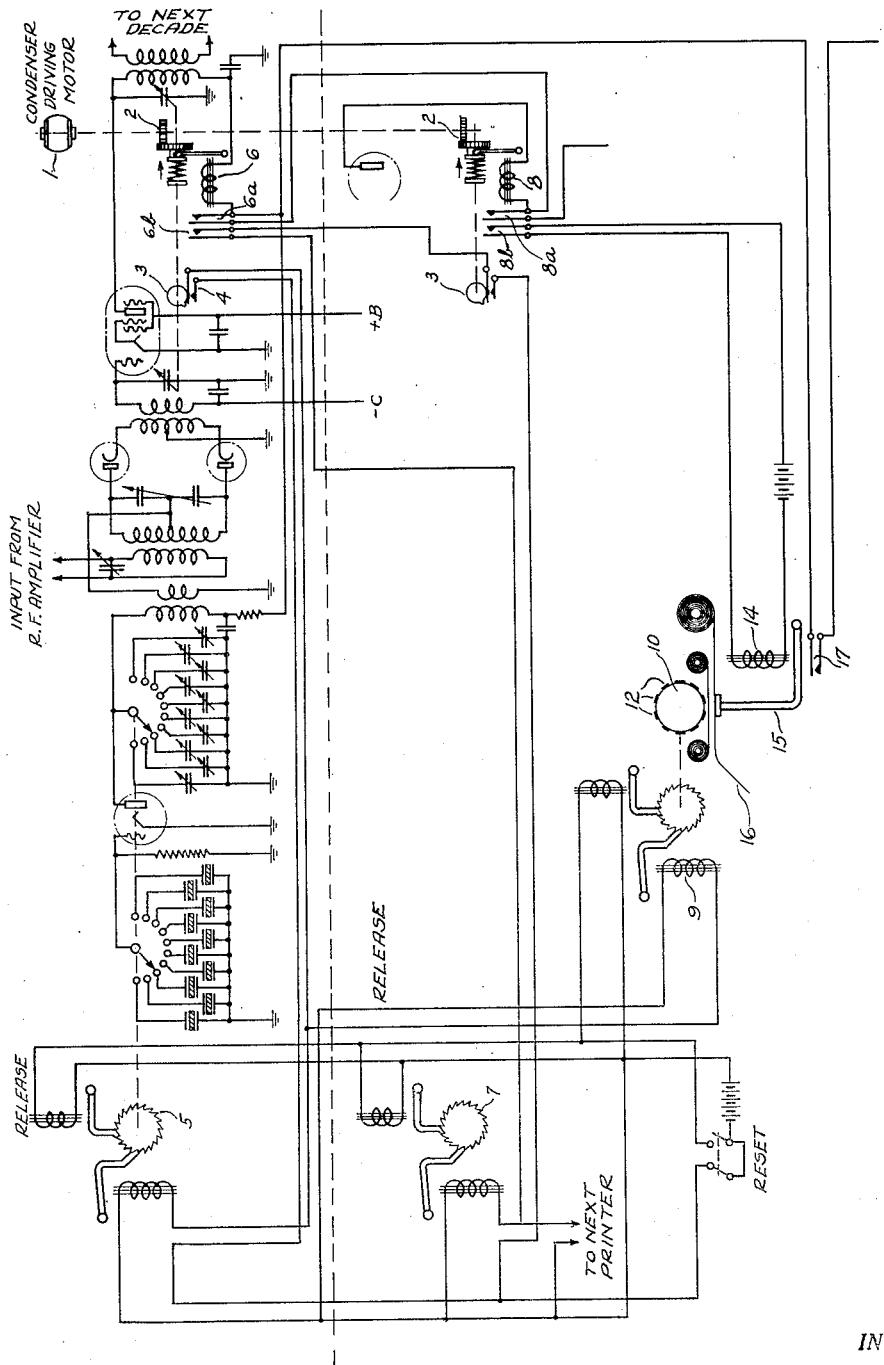

Other and further objects of my invention reside in the circuits and arrangements more fully disclosed in the specification hereinafter following and in the accompanying drawings, in which:

Figure 1 diagrammatically represents an arrangement of the decades of frequency determining elements for the measurement of a given frequency; and Fig. 2 is a schematic diagram of the connections in an automatic frequency measuring and recording system embodying the circuits of my invention.

My invention is directed to a compact construction of apparatus which may be conveniently transported and installed and which will simply and precisely measure, indicate and record the frequency of an oscillation. The apparatus of my invention is particularly characterized by the wide frequency range over which the apparatus is designed to function.

The apparatus of my invention employs a plurality of oscillator circuits, each controlled by a series of frequency determining elements. The elements in each series are productive of frequencies in the order of an arithmetical progression, that is, the difference between the frequencies of adjacent elements is the same, within a given series. The series of elements are further arranged so that the constant differences in each series form a geometrical progression, that is, the constant differences of successive series are always in the same ratio. Thus, in the arrangement shown, a decade system is adopted: that is, there are ten elements in each series; the smallest constant difference is unity; and the constant differences forming the geometrical progression are 1, 10, 100, and 1000, the constant ratio being 10:1.

In employing the arrangement shown in the measurement of an unknown frequency, the thousands component of the unknown frequency is first determined by balance with a selected local oscillation, the best frequency resulting being utilized in determining the hundreds component. Subsequently, the tens component is determined and finally the units, thus precisely measuring the given frequency.

Referring to the drawings in more detail, Fig. 1 is a block diagram of the frequency measuring system of my invention designating certain frequencies for the elements in each series which would form an operable combination.

The units decade consists of an oscillator tube circuit associated with ten piezo-electric crystals having natural vibration frequencies ranging from 150 kilocycles to 159 kilocycles in steps of 1 kilocycle. Any one of these crystals may be connected to the oscillator tube by means of a manually operated switch having ten positions numbered from 0 to 9 inclusive, the zero position connecting the 150 kilocycle crystal and the 9 position connecting the 159 kilocycle crystal with the intermediate crystals connected to the corresponding successive positions.

The tens decade, as shown in the block diagram, immediately above the units decade, consists of an oscillator associated with ten piezo-electric crystals having natural vibration frequencies ranging from 1350 kilocycles to 1440 kilocycles in steps of ten kilocycles. Any one of these crystals may be selected and placed in the circuit for operation in the same manner as accomplished in the units decade. The ten position switch is numbered from 0 to 9 inclusive, and the frequency corresponding to each position is indicated in the block diagram.

The hundreds decade is similar to the units and tens decades except that the natural vibration frequencies of the crystals range from 3500 kilocycles to 4400 kilocycles in steps of 100 kilocycles.

The frequencies of the crystals in the thousands decade unit are determined by the range desired in the system. In this case, as shown in the block diagram, the thousands decade contains a thousand kilocycle crystal and a two thousand kilocycle crystal.

Mixer circuits are provided to interconnect the various component oscillations in the system.

The thousands decade mixer combines the input oscillation of unknown frequency and a selected oscillation from the thousands decade oscillator and has a range of 1000 frequency units. The beat frequency resulting is mixed with a selected frequency from the hundreds decade in the hundreds decade mixer, which has a range of 100 units, and the beat frequency produced is passed to the tens decade mixer, which has a range of 10 units, where it is combined with a selected frequency from the tens decade. The resulting frequency is matched as closely as possible with a frequency from the units decade. From the values of the frequencies thus selected from the decade groups, the given frequency is known, since an algebraic sum of the known component frequencies has substantially balanced the unknown frequency; that is, the circuits of the measuring arrangement have been made resonant to the unknown frequency, said resonance being precisely controlled by selected frequency controlling elements in the several oscillator circuits in the system.

To measure a frequency between 3,000 and 7,999 kilocycles, a decade system with crystal frequencies and oscillators, as shown in Fig. 1, would be employed and could be embodied in either a manual or an automatic system. Consider a frequency of 4135 kilocycles. In order that the hundreds decade transmit energy, it is necessary to secure a beat frequency between the signal frequency, 4135 kilocycles, and some crystal frequency of the thousands decade oscillator which would be between 5,000 and 5,999 kilocycles which is the range of the thousands decade mixer. The only crystal frequency of the thousands decade oscillator which will give such a beat frequency is the thousand kilocycle crystal which, when using the sum frequency, will produce the beat frequency of 5135 kilocycles. Referring again to the block diagram in Fig. 1, it is seen that when the 1,000 kilocycle crystal is in use in the thousands decade, the crystal selector switch or decade switch is on 4 or 6. The connection in this case is such that when the switch is on contact 4, the sum frequency is delivered from the mixer circuit. Four, then, is the tap selected and 4,000 is the measurement given by the thousands decade. Next, it is necessary to mix a frequency with 5135 kilocycles to produce a frequency between the limits of 1500 and 1599 kilocycles, the tuning range of the hundreds decade mixer. 3600 kilocycles, when mixed with 5135 kilocycles will produce a difference frequency of 1535 kilocycles. 3600 kilocycles in the hundreds decade corresponds to 1 on the crystal selector switch and thus, we have 4100 as the measurement by the thousands and the hundreds decades.

It is now necessary to mix a frequency with 1535 kilocycles to produce a frequency between the limits of 150 and 159 kilocycles, the range of the tens decade mixer. 1380 kilocycles in the tens decade oscillator will produce, when mixed with 1535 kilocycles, a difference frequency of 155 kilocycles. 1380 kilocycles corresponds to 3 on the decade switch in the tens decade and thus 3 is the third number in the measured frequency and we have 4130 as the measurement at this state. The 155 kilocycle oscillation is now mixed with a frequency from the units decade to produce the lowest audible beat note. In this case, the 155 kilocycle crystal in the units decade corresponding to 5 on the decade switch will produce a zero beat frequency and the original input frequency has been measured as being 4135. While the zero "audio" frequency cannot be heard, it is found at tap 5 between 1000 cycle notes on taps 4 and 6, 2000 cycle notes on taps 3 and 7, etc., and is thus easily identified.

The system of my invention may be adapted for automatic operation to measure the frequency of an oscillation impressed on the system. The various tap arrangements for selecting a particular frequency determining element for operation in the oscillator circuit and a corresponding tuned circuit cooperating therewith are adapted to be actuated by Strowger relays. A mixer circuit of the balanced rectifier type is employed throughout the system. Such a mixer circuit is fully described in detail in my copending application, Serial No. 737,309, of which this application is a division. The tuning of the mixer circuit is effected by tuning the input circuit of the amplifier connected with the individual mixer circuit.

As shown in Fig. 2, I provide a motor 1 which rotates the tuning condensers in each decade amplifier by means of friction clutches 2 which may be disengaged magnetically. The motor also drives, through each clutch, a cam arrangement 3 which operates contacts 4. When contacts 4 are closed, Strowger relay 5 is energized and operates to advance the crystal selector switch and tuned circuit switch one tap. Condensers continue to rotate and tune through the range. If no beat frequency within the range of the tuning cycle is produced, the cam 3 again operates contacts 4, and energizes relay 5 to advance the selector switches another tap. This operation takes place until a beat frequency occurs between the incoming signal from the radio frequency amplifier and the crystal frequency which is being used. At this position of the condensers, there is an increase in the plate current in the amplifier which operates relay 6, releasing the friction clutch 2 and closing contacts 6a and 6b. Contacts 6a supply plate potential to the next amplifier and contacts 6b prepare Strowger relay 7 for operation.

The controls in the next decade continue to rotate and at each revolution advance the crystal selector and tuned circuit switches one tap until a beat frequency occurs. The relay 8 is then energized closing contacts 8a and 8b. This interconnection extends to include controls in each decade frequency unit.

In the arrangement shown in Fig. 2, the relay 8 is considered as connected in the units decade control, that is, the final selecting group, and contacts 8a are not employed. Contacts 8b on the other hand, are used to actuate mechanism necessary to automatically print the frequency measured on a tape to automatically record the frequency. As shown in Fig. 2, Strowger relay 9 is connected in parallel with Strowger relay 5 so that the angular motion at 9 is equal to that at 5 and is employed to rotate a drum 10 having on its periphery number dies 12 corresponding to the numbers on manually operated decade switches, as shown in the block diagram of the decade frequency unit in Fig. 1. Leads from Strowger relay coil 7 are shown "to next printer," indicating that they would actuate another relay and mechanism identical with that at 9 so that the number in the second frequency decade would be automatically printed when the entire operation of measuring had been completed. Each decade frequency section is thus provided with a printer unit, and when contacts 8b are closed, relay 14 is energized, and actuates the arm 15 which prints the numbers aligned on the several drums on a tap 16. At the same time, relay 14 also opens contacts 17 opening the plate circuits of the several amplifiers and returning the tuning mechanism to its original condition where all controls are rotating.

In the manual system, the correct tuning to obtain the best frequency in the range of the unit is indicated by the deflection of the needle in the meter in the output circuit of the respective mixer. In the automatic system, the relay in the output circuit automatically responds to the increase of current at the position of correct tuning, or resonance.

While Figures 1 and 2 are diagrammatic, it is understood that the switches shown in each decade will be controlled by dial or index means on a panel, and digits corresponding to the digits shown in each decade in Figure 1 will be associated with the dial or index means in the same manner as indicated in Figure 1. A suitable panel and dial arrangement is shown, for example, in Figure 7 of the copending application, Serial No. 737,309, above referred to. While this panel arrangement is referred to as an example, it is to be understood, of course, that other panel and dial arrangements may be utilized. For example, a rotating dial might bear thereon the digits and a fixed index might be used to indicate the correct digit in each decade. Other arrangements will, of course, occur to those skilled in the art and it is therefore not intended to limit the dial indicating arrangement to any particular form.

I have shown my invention particularly adapted for operation with piezo electric crystals, but I desire that it be understood that my invention is equally adaptable to magnetostriction and other types of constant frequency devices.

While I have described my invention in certain of its preferred embodiments, I desire it to be understood that modifications may be made and that no limitations upon my invention are intended other than may be imposed by the scope of the appended claims.

What I claim as new and desire to secure by Letters Patent of the United States is as follows:

1. In a frequency measuring system the combination of a plurality of oscillation generators, one of said oscillation generators including means for producing a plurality of frequencies increasing in steps of one thousand frequency units, a second of said oscillation generators including means for producing a plurality of frequencies increasing in steps of one hundred frequency units, a third of said oscillation generators including means for producing a plurality of frequencies increasing in steps of ten frequency units and a fourth of said oscillation generators including means for producing a plurality of frequencies increasing in steps of one frequency unit, a mixer circuit for said first generator, means for feeding oscillations of an unknown frequency to said mixer circuit for producing a beat frequency between oscillations generated by said first generator and the unknown frequency oscillations, and means for beating said beat frequency with a frequency produced by said second oscillation generator for producing a beat frequency of lower frequency, and means for beating said last beat frequency with a frequency produced by said third oscillation generator for producing a beat frequency of still lower frequency, means for beating said last beat frequency with a frequency produced by said fourth oscillation generator for producing a substantially zero beat frequency, means for indicating said substantially zero beat frequency, means for determining the frequency of the unknown frequency, automatic means for making a printed record of said determined frequency, and means controlled in accordance with the adjustment of said oscillation generators and said mixer circuits for controlling said automatic printing means.

2. In a decade frequency measuring system the combination of a plurality of oscillation generators, said oscillation generators being arranged in a series such that the first oscillation generator is adapted to produce a plurality of frequencies increasing in steps of one thousand frequency units; an indicator dial for said first oscillation generator, said indicator dial having a plurality of digits each corresponding to a different frequency generated, the second oscillation generator is adapted to produce a plurality of frequencies increasing in steps of one hundred frequency units; the third oscillation generator is adapted to produce a plurality of frequencies increasing in steps of ten frequency units and the fourth oscillation generator is adapted to produce a plurality of frequencies increasing in steps of one frequency unit, an indicator dial for each of said second, third, and fourth oscillation generators, each of said last mentioned indicator dials having a plurality of digits thereon, each digit corresponding to a different frequency produced by the correspondng generator, means including a mixer circuit connected to each generator for producing a unique beat frequency between the oscillations derived from one of said oscillation generators and oscillations of an unknown frequency and means for producing a series of unique beat frequencies of progressively decreasing frequencies between the outputs of each of said oscillation generators and the beat frequency derived from the mixer circuit of the preceding generator for deriving a zero beat, means for indicating said zero beat, the digits of said indicator dials being so arranged with respect to the frequencies of said first, second, third, and fourth oscillation generators that the frequency of unknown frequency oscillations is given by said indicator dials direct when said zero beat is indicated, by collecting the digits indicated by said dials corresponding only to the frequencies of said oscillation generators used to obtain said zero beat.

3. In a decade frequency measuring system the combination of a plurality of oscillation generators, one of said oscillation generators including means for producing a plurality of frequencies increasing in steps of one thousand frequency units, a second of said oscillation generators including means for producing a plurality of frequencies increasing in steps of one hundred frequency units, a third of said oscillation generators including means for producing a plurality of frequencies increasing in steps of ten frequency units and a fourth of said oscillation generators including means for producing a plurality of frequencies increasing in steps of one frequency unit, a mixer circuit for said first generator, means for feeding oscillations of an unknown frequency to said mixer circuit for producing a unique beat frequency between oscillations generated by said first generator and the unknown frequency oscillations, and means for beating said beat frequency with a frequency produced by said second oscillation generator for producing a unique beat frequency of lower frequency, and means for beating said last beat frequency with a frequency produced by said third oscillation generator for producing a unique beat frequency of still lower frequency, means for beating said last beat frequency with a frequency produced by said fourth oscillation generator for producing a substantially zero beat frequency, means for indicating said substantially zero beat frequency, an indicator dial for each of said oscillation generators, each of said indicators having a plurality of digits corresponding to the number of frequencies to be developed by the corresponding generator, the digits of each of said indicators being so arranged with respect to each of the frequency selectors of each of said first, second, third, and fourth oscillation generators that the frequency of the unknown frequency oscillations is given by said indicators direct when said zero beat is indicated, by collecting the digits indicated by said indicators corresponding only to the frequencies of said oscillation generators used to obtain said zero beat.

4. In a decade frequency measuring system the combination of a plurality of oscillation generators, one of said oscillation generators including means for producing a plurality of frequencies increasing in steps of one thousand frequency units, a second of said oscillation generators including means for producing a plurality of frequencies increasing in steps of one hundred frequency units, a third of said oscillation generators including means for producing a plurality of frequencies increasing in steps of ten frequency units, a fourth of said oscillation generators including means for producing a plurality of frequencies increasing in steps of one frequency unit, a mixer circuit for said first generator, means for feeding oscillations of an unknown frequency to said mixer circuit for producing a beat frequency between oscillations generated by said first generator and the unknown frequency oscillations, and means for beating said beat frequency with a frequency produced by said second oscillation generator for producing a beat frequency of lower frequency, and means for beating said last beat frequency with a frequency produced by said third oscillation generator for producing a beat frequency of still lower frequency, means for beating said last beat frequency with a frequency produced by said fourth oscillation generator for producing a substantially zero beat frequency, means for indicating said substantially zero beat frequency, means for determining the frequency of the unknown frequency, said last mentioned means including an indicator for each of said oscillation generators, each of said indicators having a plurality of digits corresponding to the number of frequencies to be developed by the corresponding generator, the digits of each of said indicators being so arranged with respect to each of the frequency selectors of each of said first, second, third, and fourth oscillation generators that the frequency of the unknown frequency oscillations is given by said indicators direct when said zero beat is indicated, by collecting the digits indicated by said indicators corresponding only to the frequencies of said oscillation generators used to obtain said zero beat, automatic means for making a printed record of said determined frequency, and means controlled in accordance with the adjustment of said oscillation generators and said mixer circuits for controlling said automatic printing means.

5. In a decade frequency measuring system the combination of an oscillation generator system having four sets of electromechanically vibratile standard frequency elements, frequencies of the elements of each of said sets being arranged to increase progressively by predetermined steps, an indicator device for each of said sets of electromechanically vibratile elements, each of said indicator devices having a plurality of digits thereon, each of said digits corresponding to a frequency step, means for deriving a frequency from said oscillation generator system and producing a zero beat with an unknown frequency, the digits on said indicators being so arranged with respect to the frequencies of said first, second, third, and fourth sets of electromechanically vibratile elements that the value of the unknown frequency is given direct by said indicators when said zero beat is produced.

6. A decade frequency measuring system according to claim 5 including, automatic means for making a printed record of the given value of the unknown frequency and means connected to selected ones of said oscillation generators for controlling said automatic printing means.

7. A decade frequency measuring system according to claim 2 including automatic means for making a printed record of the frequency given by said indicators and means controlled in accordance with the adjustment of said oscillation generators and said mixer circuits for controlling said automatic printing means.

8. In a system for measuring oscillations of unknown frequencies, a plurality of series of electromechanical vibratory oscillation generators, each series having a predetermined frequency relation to each of the other of said series, means for producing a beat frequency between only one generator in any one series and an oscillation of unknown frequency, means for combining the beat frequencies of two or more of said series, the several generators in each of said series being represented by digits which are repeated in each of said series, indicating means associated with each of said series whereby when zero beat is obtained between the last of said series and said oscillation of unknown frequency the digits indicated by said indicating means will give a direct reading of the value of said oscillation of unknown frequency.

9. In a frequency measuring system, a plurality of oscillator decades, the oscillator frequencies in each decade being separated by a constant amount, the several decades of the series being separated in frequency by a constant ratio, mounting means for said decades bearing a succession of the same digits for each decade, oscillator mixing circuits interconnecting the several decades and an oscillator of a frequency to be determined, means for causing a unique beat frequency successively between said decades and the last mentioned oscillator, indicating means associated with each of said decades, said indicating means cooperating with digits of said decades to give a direct reading of the value of the frequency originally to be determined.

HAROLD GRANGER.